United States Patent [19]
Beresnev et al.

[11] Patent Number: 5,327,273
[45] Date of Patent: Jul. 5, 1994

[54] BISTABLE FERROELECTRIC LIQUID CRYSTAL DISPLAY CELL

[75] Inventors: Leonid A. Beresnev, Moscow, U.S.S.R.; Richard Buchecker, Zurich, Switzerland; Nina I. Chernova; Vladimir G. Chigrinov, both of Moscow, U.S.S.R.; Jürg Fünfschilling, Basel, Switzerland; Marina V. Loseva, Moscow, U.S.S.R.; Yury P. Panarin, Moscow, U.S.S.R.; Fvgeniy P. Pozhidaev, Moscow, U.S.S.R.; Martin Schadt, Seltisberg, Switzerland

[73] Assignee: Hoffmann-La Roche Inc., Nutley, N.J.

[21] Appl. No.: 46,468

[22] Filed: Apr. 12, 1993

Related U.S. Application Data

[63] Continuation of Ser. No. 925,882, Aug. 6, 1992, abandoned, which is a continuation of Ser. No. 770,739, Oct. 9, 1991, abandoned, which is a continuation of Ser. No. 543,508, Jun. 26, 1990, abandoned.

[30] Foreign Application Priority Data

Jun. 29, 1989 [CH] Switzerland ............ 2408/89
Jun. 30, 1989 [CH] Switzerland ............ 2447/89
Oct. 18, 1989 [CH] Switzerland ............ 3780/89

[51] Int. Cl.$^5$ .................................. G02F 1/13
[52] U.S. Cl. ........................ 359/104; 359/63; 359/99; 359/100
[58] Field of Search ........... 357/346, 340, 341, 350 S, 357/337, 347 E, 347 R; 359/99, 100, 104, 63

[56] References Cited

U.S. PATENT DOCUMENTS

| | | | |
|---|---|---|---|
| 4,753,752 | 6/1988 | Raynes et al. | 359/104 |
| 4,838,663 | 6/1989 | Lagerwall et al. | 350/350 S |
| 4,852,978 | 8/1989 | Davey et al. | 350/350 S |
| 4,876,028 | 10/1989 | Hemmerling et al. | 350/345 |
| 4,913,838 | 4/1990 | Miyazawa et al. | 350/350 S |
| 4,969,719 | 11/1990 | Bradshaw et al. | 350/350 S |
| 4,997,264 | 3/1991 | Coulson | 350/346 |
| 5,064,569 | 11/1991 | Geelhaar et al. | 359/104 |
| 5,100,577 | 3/1992 | Buchecker et al. | 359/104 |
| 5,242,619 | 9/1993 | Buchecker et al. | 359/104 |

FOREIGN PATENT DOCUMENTS

| | | | |
|---|---|---|---|
| 0213841 | 3/1987 | European Pat. Off. | 350/350 S |
| 213841 | 3/1987 | European Pat. Off. | 350/350 S |
| 0219480 | 4/1987 | European Pat. Off. | 359/104 |
| 283916 | 3/1988 | European Pat. Off. | 359/104 |
| 259963 | 6/1988 | European Pat. Off. | 350/350 S |
| 0269963 | 6/1988 | European Pat. Off. | 350/350 S |
| 0309774 | 4/1989 | European Pat. Off. | 359/104 |
| 59-79221 | 5/1984 | Japan | 350/346 |
| 61-249019 | 11/1986 | Japan | 350/350 S |
| 1-253716 | 10/1989 | Japan | 350/334 |
| 87/05017 | 8/1987 | World Int. Prop. O. | 359/104 |

OTHER PUBLICATIONS

*Molecular Crystal Liquid Crystal*, vol. 94, pp. 213-234, (1983), Clark et al., "Ferroelectric Liquid Crystal Electro-Optics Using the Surface ... ".

SID Proceedings, Society for Information Display, May 1990, pp. 106-109, J. Funfschilling and M. Schadt, "Short Pitch Bistable Ferroelectric LCDs".

Lagerwall et al., "Ferroelectric Liquid Crystals", 1984, Mol. Cryst. Liq. Cryst. vol. 114, pp. 151-187.

(List continued on next page.)

*Primary Examiner*—Rolf Hille
*Assistant Examiner*—Minhloan Tran
*Attorney, Agent, or Firm*—George M. Gould; George W. Johnston; John P. Parise

[57] ABSTRACT

A bistable ferroelectric liquid crystal display cell utilizes two plates, a chiral ferroelectric smectic liquid crystal sandwiched between the plates, and an electrode for applying an electrical field to the plates. The chiral ferroelectric smectic liquid crystal has a structure which is influenced by the action of an electric field so that its optical anisotropy changes. By using a first polarizer connected to one of the plates and a second polarizer connected to the other plate, the unique bistable ferroelectric display produces dark parallel stripes when the polarizers are in a cross position relative to each other.

4 Claims, 4 Drawing Sheets

OTHER PUBLICATIONS

Ferroelectrics, 77: pp. 137–144 (1988), Taniguchi et al., "Dependence . . . ".

Acta Cryst 4: p. 219 (Jul. 7, 1950), Vries, "Rotatory Power . . . Crystal".

Ostrovski et al., Advances in Liquid Crystal Research and Application, 1980, pp. 469–482, "Behavior of Ferroelectric . . . ".

Beresnev et al., Soviet Technical Physics Letters 14: pp. 116–17 (Feb. 1988), "Electrooptic Response . . . Polarization".

BISTABLE FERROELECTRIC LIQUID CRYSTAL DISPLAY CELL

This is a continuation of application Ser. No. 07/925,882 filed Aug. 6, 1992, abandoned, which is a continuation of Ser. No. 07/770,739 filed Oct. 9, 1991, abandoned, which is a continuation of Ser. No. 07/543,508 filed Jun. 26, 1990, abandoned.

FIELD OF THE INVENTION

The invention relates to a liquid crystal display cell having a chiral ferroelectric smectic liquid crystal layer, the structure of which is so influenced by action of an electric field that its optical anisotropy changes, a pair of transparent plates enclosing the liquid crystal and having electrodes for generating an electric field therein, at least one plate having a surface structure which aligns the molecules of the liquid crystal, and one polarizer disposed in front and one polarizer behind the liquid crystal.

BACKGROUND OF THE INVENTION

Liquid crystal cells of the aforementioned kind, depending on the nature of the liquid crystal, react in various ways when a strong electric field (e.g. 10 V/$\mu$) is switched on or off. In most cases, switching-on results in an approximately homogeneous structure (possibly with a number of dislocations) whereas switching-off may result in a helix, as is the case in DHF cells described in B. I. Ostrovski, Advances in Liquid Crystal Research and Applications, Oxford/Budapest, 1980, pages 469 ff.

The known Surface Stabilized Ferroelectric Liquid Crystal (SSFLC) effect of Lagerwall and Clark is different In nature, its main characteristic being that the helix which normally forms in the liquid crystals is suppressed by interaction with the surface. In order for the suppression to occur, the pitch of the helix must be considerably longer than the thickness of the display. This effect is described in Mol. Cryst. Liq. Cryst. 94 (1983), 213-234 and 114 (1984), 151-187.

European patent application No. 88104176.8 describes another liquid crystal display which also uses liquid crystals having a small pitch. In this device, the structure of the liquid crystal in the cell comprises homogeneously oriented boundary layers (as in SSF-LCDs) and a helix structure in the interior of the cell.

The disadvantage of the known cells is that the critical wall orientation causes difficulties. Also, the "memory switching angles" are considerably smaller than the optimum of 45°. The object of the present invention is to eliminate these disadvantages.

SUMMARY OF THE INVENTION

According to the invention, this object is achieved by a liquid crystal cell having two plate means sandwiching a chiral ferroelectric smectic liquid crystal means. Each plate means is connected to a polarizer so that two plate surfaces face each other and the polarizers face away from each other. In a plate surface of one of the plate means is located a directional means used for aligning liquid crystal molecules in the cell. The chiral ferroelectric smectic liquid crystal means has a structure which is so influenced by an electric field so that its optical anisotropy is changes and the L.C. means is composed of an achiral smectic host mixture. This host mixture has a spontaneous polarizability of about $P > 10$ nC/cm$^2$ and a smectic C tilting angle of about $\theta > 10°$ and is made up of at least two liquid crystal components. The first component has a tilted smectic phase and the second component has one or more chiral dopants which induce a helical pitch in the host mixture of about $p < \mu m$. An electrode means is used for applying the electrical field to the plate means and the electrical field shapes the liquid crystal means so that after shaping at about a zero voltage and with the polarizers in a crossed position the liquid crystal cell forms dark parallel stripes indicating a non-homogeneous cell structure.

It has surprisingly been found that if the liquid crystal has an appropriate composition as hereinafter disclosed, the helix does not form or its formation is greatly delayed (for seconds to hours) and the planar structure is maintained in that it is stabilized by a network of parallel dislocations visible as dark lines between intersecting polarizers. If a field is briefly applied in the opposite direction, a homogeneous structure again forms but its optical axis is rotated from the first direction through the "bistable switching angle". This can be used for bistable switching between two stable or quasi-stable positions of the director.

This effect is also observable is thick cells (e.g. 25$\mu$).

This is in contrast to the SSFLC effect.

The cell according to the invention has a number of important advantages.

It has great brightness. In contrast to SSF-LCDs, the "memory switching angle" is almost the same as the switching angle on saturation, i.e. the bistable structure is efficiently stabilized even at zero voltage. As a result, optimum switching angles (45°) are obtainable.

The cell has short switching times because the LC mixtures have high spontaneous polarization, and thus the switching times are correspondingly short. There are no problems of pitch compensation or the like.

The choice of cell thickness is relatively unrestricted. The bistability is not due to a surface effect, and consequently there is no restriction in the choice of cell thickness. However, thin cells are best [$\Delta n.d = \lambda/2$ with $\lambda =$ wavelength (0.55$\mu$)].

Finally, the wall orientation is less critical than in the prior art. The bistable structure of the liquid crystal layer is substantially determined by the applied field, and the surface is not responsible for bistability but only for the alignment of the smectic planes on transition to the S$_c$* phase.

BRIEF DESCRIPTION OF THE DRAWINGS

Embodiments of the invention will now be described with reference to the accompanying drawings, in which.

DETAILED DESCRIPTION OF PREFERRED EMBODIMENTS

Figure 1:
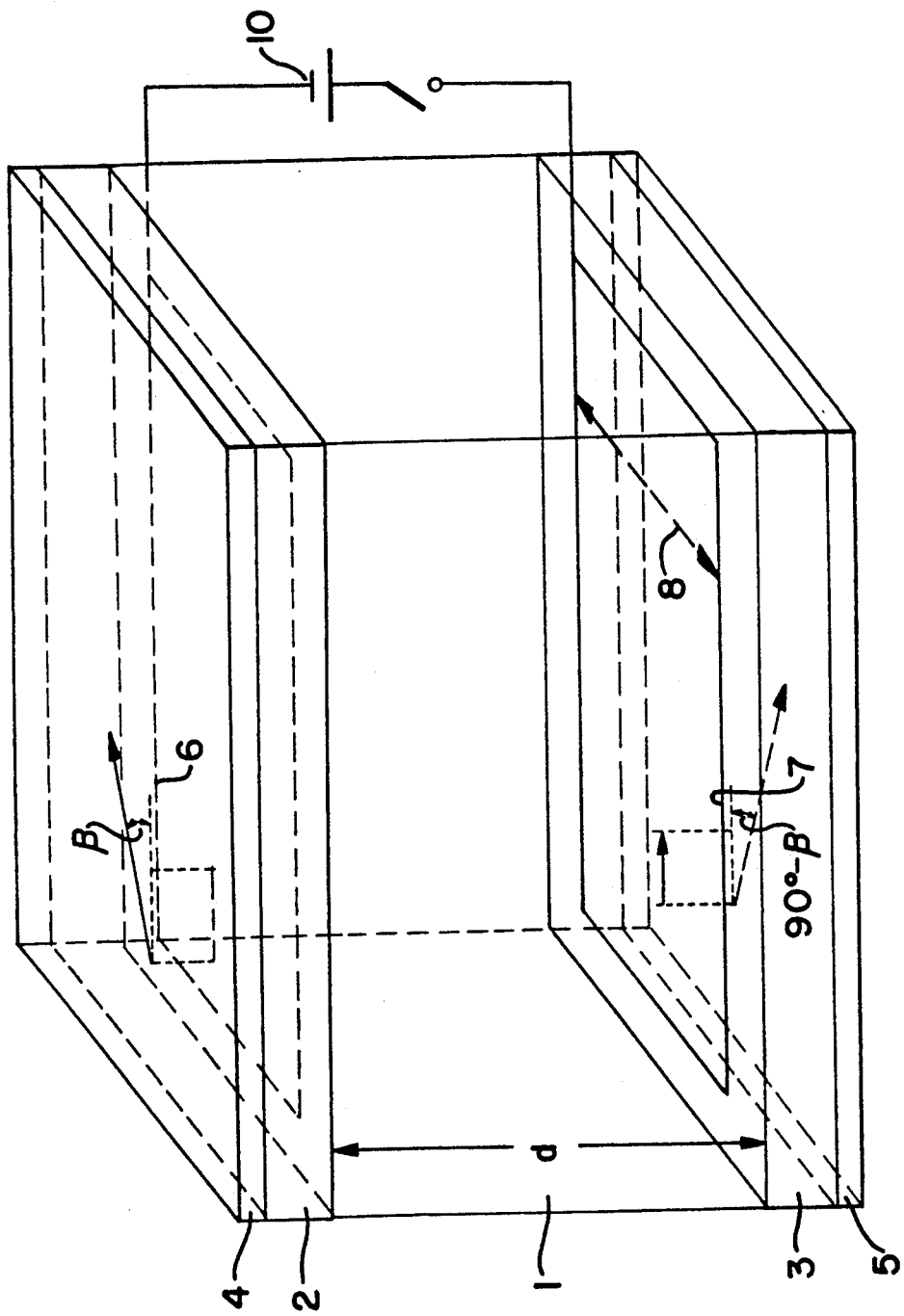
FIG. 1 is a diagrammatic perspective view of a small portion of a liquid cell according to a preferred embodiment of the invention.

As FIG. 1 shows, the liquid crystal cell comprises a liquid crystal layer 1 disposed between two substantially plane-parallel plates 2, 3 made of glass or another transparent material such as acrylic glass or plastics sheets. The spacing between the plates is obtained in known manner, using polymer balls having a diameter of 2μ. The plates are thus spaced apart by d=1.8μ. A polarizer 4 is disposed in front of the front plate 2 and connected thereto preferably by sticking. A polarizer 5 is similarly associated with the rear plate 3.

The surfaces of plates 2, 3 facing the liquid crystal have the conventional electrode coatings, which are segmented to represent characters or image spots. The portion of a cell shown in FIG. 1 has only a single electrode segment 6 on plate 2 and a facing electrode segment 7 on the rear plate 3.

The surfaces of the glass plates facing the liquid crystal, i.e. the inner surfaces, are also treated so that they exert a directional effect on the adjacent liquid-crystal molecules and thus determine the direction of the director. In the present description, the result of this treatment is called "surface orientation".

One known method of surface orientation is to provide the inner surfaces of the glass plates with a PVA layer which is rubbed in one direction. The directions in which the two plates are rubbed are approximately parallel.

Measurements on cells in which only one plate was rubbed, have shown that the initially-mentioned dislocation lines are rotated through an angle α of about 4° to 80° relative to the direction of rubbing. In a given liquid crystal mixture the rotation is always in the same direction relative to the direction of the normal to the liquid crystal layer. It is therefore particularly advantageous to rub the two plates so that the dislocation lines near the plates are parallel, i.e. one plate is rubbed after being rotated through an angle 2α relative to the other plate. This avoids disturbances to the parallelism of the dislocation lines, which would occur if the two plates were exactly parallel when rubbed.

Another possible method of obtaining optimum parallelism of the dislocation lines, is to rub only one of the two plates.

In general, it is assumed that the two bistable states become more stable when the parallelism of the dislocation lines is improved.

Another known method of surface orientation is oblique vacuum metallizing of orienting layers, etc.

Surface orientation occurs mainly in the $S_A$ phase above the $S_C*$ phase the result being that the smectic layers are disposed perpendicular to the direction of rubbing (the "bookshelf" structure). The surface orientation on the two plates in the $S_A$ phase is shown by the short arrows. The direction of the lines of intersection between the smectic planes and the glass plate is denoted by an arrow 8. On transition to the $S_C*$/phase, there is no change in the direction of the planes, or at least in the direction of the lines of intersection between the smectic planes and the electrode surfaces. The director-itself can rotate away from the direction of rubbing.

The polarizer 4 belonging to the front plate is disposed at an angle β to the axis of the helix or the direction of the dislocation lines. The polarizer belonging to the rear plate is rotated through an angle of 90° relative to the front polarizer. The directions of polarization are shown by the long arrows in FIG. 1. This arrangement of polarizers is a preferred embodiment. Other arrangements are possible and likewise give good results. The suitable polarizer arrangements can be determined without difficulty, by simple adjustment.

The liquid crystal 1 is a chiral smectic ferroelectric crystal, frequently described as smectic C ($S_C$) in the literature. Liquid crystals of this kind are known from the literature. They are characterized by the fact that the molecules are disposed not at right angles to the smectic planes but at a certain angle, the smectic tilt angle $θ_o$. The chirality is due to the fact that, unless influenced by walls or electric fields, the directions of the molecules are not parallel in all the layers, but are in different directions in different layers, resulting in an overall helical twist.

The liquid crystal is preferably a mixture of an achiral $S_C$ host mixture comprising at least two LC components, at least one containing a tilted smectic phase (e.g. $S_C$), and one or more chiral dopants which individually or together induce a helical pitch p<1 μm, the spontaneous polarizability of the total mixture being P>10 nC/cm² and the $S_c$ tilt angle of the final mixture being $θ$>10°. The following values are particularly preferred: P>20 nC/cm² and $θ$>17°.

Mixtures of the following components have been found particularly suitable:

1. 5-30 wt. % of a phenyl benzoate comprising a cyclohexyl radical bonded via a flexible group.

Such substances are described in U.S. Pat. applications Ser. Nos. 07/464,610 and 07/455,470 (applications corresponding to EP-A-0 269 963 which corresponds to U.S. Pat. No. 5,100,577) and include compounds of formula

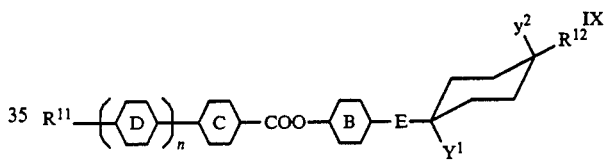

wherein $R^{11}$ and $R^{12}$ each independently represent optionally halogen-substituted $C_1$-$C_{18}$-alkyl or optionally halogen-substituted $C_2$-$C_{18}$-alkenyl in which optionally one $CH_2$ group or two non-adjacent $CH_2$ groups are replaced by oxygen; rings B, C and D denote 1,4-phenylene optionally substituted with cyano, halogen or lower alkyl; n stands for the number 0 or 1; E is a single covalent bond; and $Y^1$ and $Y^2$ are hydrogen or one of $Y^1$ and $Y^2$ is also cyano.

2. 30-85 wt. % of other $S_C$ materials as described in the aforementioned U.S. patent applications Ser. Nos. 7/464,610 and 07/455,470 (applications corresponding to EPA-0 269 963) and include esters of formula

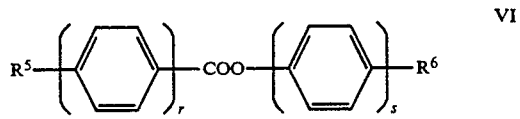

wherein $R^5$ and $R^6$ are alkyl, alkoxy, alkanoyl, alkanoyloxy, alkoxycarbonyl or alkoxycarbonyloxy with up to 18 carbon atoms; and r and s each independently are 1 or 2, and pyrimidine compounds of formula

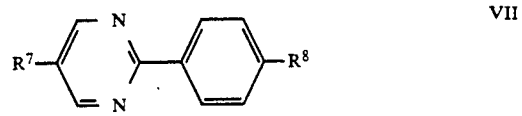

wherein $R^7$ and $R^8$ represent alkyl or alkoxy with 1–18 carbon atoms, and phenyl pyridine compounds of formula

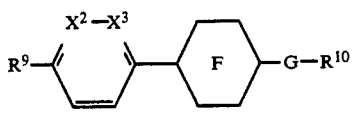
VIII wherein $R^9$ and $R^{10}$ each are an optionally halogen-substituted alkyl or alkenyl group in which optionally one $CH_2$ group or two non-adjacent $CH_2$ groups are replaced by —O—, —COO— and/or —OOC—; $X^2$ is CH and $X^3$ is N or $X^2$ is N and $X^3$ is CH; G is a single covalent bond, trans-1,4-cyclohexylene, cis-4-cyano-trans-1,4-cyclohexylene or 1,4-phenylene optionally substituted with halogen or methyl; and ring F represents trans-1,4-cyclohexene, 1,4-phenylene optionally substituted with halogen or methyl or, when G is a single covalent bond, ring F is cis-4-cyano-trans-1,4-cyclohexylene, and alkenyl substituted compounds of formula

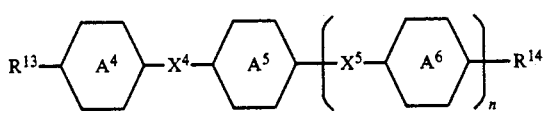
X wherein $R^{13}$ is an optionally halogen-substituted alkenyl group with up to 18 carbon atoms in which optionally 1 $CH_2$ group or 2 non-adjacent $CH_2$ groups are replaced by —O—, —CO—, —COO— or —OOC— and/or optionally a C—C single bond is replaced by a C=C double bond: $R^{14}$ is an optionally halogen- substituted alkyl group with up to 18 carbon atoms in which optionally 1 $CH_2$ group or 2 non-adjacent $CH_2$ groups are replaced by —O—, —CO—, —COO— or —OOC— and/or optionally a C—C single bond is replaced by a C—C double bond; N is 0 or 1: rings $A^4$, $A^5$, $A^6$ each independently are unsubstituted 1,4-phenylene or 1,4-phenylene substituted with cyano, halogen or lower alkyl or one of the rings is also pyrimidin-2,5-diyl or pyrazin-2,5-diyl and/or when n stands for the number 1, one of the rings also is trans-1,4-cyclo- hexylene or trans-m-dioxan-2,5-diyl; $X^4$ is a single covalent bond, —COO—, or —OOC—; and $X^5$ is a single covalent bond, —OCH$_2$— or , —CH$_2$O—, and tricyclic pyrimidine compounds of formula

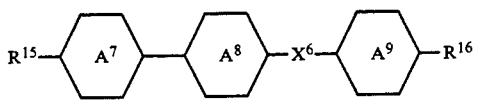
XI wherein $R^{15}$ and $R^{16}$ each independently are an optionally halogen-substituted alkyl group with up to 18 carbon atoms in which optimally 1 $CH_2$ group or 2 non-adjacent $CH_2$ groups are replaced by —O—, —CO—, —COO— and/or —OOC—; one of rings $A^7$, $A^8$ and $A^9$ is pyrimidin-2,5-diyl, one of rings $A^7$, $A^8$ and $A^9$ is unsubstituted 1,4-phenylene or 1,4- phenylene substituted with cyano, halogen or lower alkyl and one of rings $A^7$, $A^8$ and $A^9$ represents a trans-1,4-cyclohexylene or unsubstituted 1,4-phenylene or 1,4-phenylene substituted with cyano, halogen or lower alkyl; and $X^6$ is a single covalent bond, —COO—, —OOC—, —CH$_2$CH$_2$—, —OCH$_2$— or —CH$_2$O—, and dioxan derivation compounds of formula

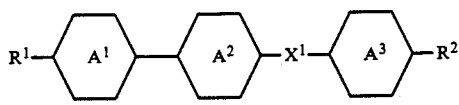
I wherein $R^1$ and $R^2$ each independently is an optionally halogen-substituted alkyl group with up to 18 carbon atoms in which optionally one $CH_2$ group or two non-adjacent $CH_2$ groups are replaced by —O—, —CO—, —COO— and/or —OOC—; one of rings $A^1$, $A^2$ and $A^3$ is trans-m-dioxan-2,5-diyl and the other two of rings $A^1$, $A^2$ and $A^3$ each independently represent unsubstituted 1,4-phenylene or 1,4-phenylene substituted with cyano. halogen or lower alkyl; and $X^1$ is a single covalent bond, —COO—, —OOC—, —CH$_2$CH$_2$—, —OCH$_2$— or —CH$_2$O—.

3. 10–40 wt. % of chiral dopants with two terminal chiral groups as described in U.S. Pat. No. 4,753,752 (corresponding to EP-A-0 213 841) and WO 87/05017 and U.S. patent application Ser. No. 07/343,477 including compounds of formula

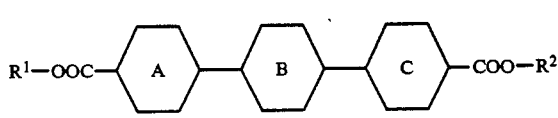
I wherein rings A, B and C each independently are 1,4-phenylene, which is unsubstituted of substituted with at least one of halogen, cyano, methyl or methoxy, and in which optionally 1 CH group or 2 CH groups is/are replaced by nitrogen: $R^1$ represents the radical of an optically active terpene alcohol after cleavage of the hydroxy group or a group —(CH$_2$)$_m$—C*HX$^1$—R$^3$: $R^2$ represents the radical of an optically active terpene alcohol after cleavage of the hydroxy group or a group —(CH$_2$)$_n$—C*HX$^2$—R$^4$; m and n each independently stand for the number 0 or 1; C* denotes a chiral carbon atom; $X^1$ and $X^2$ each independently represent fluorine, chlorine, cyano, methyl or methoxy; $R^3$ and $R^4$ each independently denote a group R, phenyl or phenyl; substituted with R, provided that $R^3$ is different from $X^1$ and $R^4$ is different from $X^2$; R is an alkyl group in which optionally one methylene group is replaced by oxygen or optionally one group CH—CH is replaced by a group C=C; provided that $R^1$ and $R^2$ do not simultaneously denote 2-alkyl when rings A, B and C together represent p-terphenyl and compounds described in U.S. Pat. No. 4,753,752 (corresponding to EP A-0 213 841) and WO 87/05017.

Preferred chiral dopants include optically active compounds having formula:

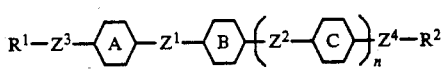
I wherein n stands for the number 0 or 1: the rings A, B and C independently denote 1,4-phenylene, unsubstituted or substituted by halogen, cyano, methyl and/or methoxy and in which 1 or 2 CH groups are replaced by nitrogen if required, or one of the rings A, B and C also denotes trans-1,4-cyclohexylene; $Z^1$ and $Z^2$ independently denote a single covalent bond, —CH$_2$CH$_2$, —OCH₂—, —CH₂O—, —COO— or —OOC—; Z³ and Z⁴ independently denote a single covalent bond or oxygen, —COO— or —OOC; R¹ and R² independently denote the radical of an optically active terpene alcohol after splitting off the hydroxy group or a chiral group —C*HX¹—R³, —CH₂C*HX¹—R³, —C*H(CH₃)—COOR³, —C*HR⁴—COOR³, —C*H(CH₃)—CH₂OR³, —C*H(CH₃)— CH₂COOR³ or —C*H(CH₃)—CH₂CH₂OR³; C* denotes a chiral carbon atom: X¹ denotes fluorine, chlorine, cyano, methyl, hydroxy, methoxy or methoxycarbonyl; R³ denotes alkyl or alkenyl and R⁴ denotes phenyl, and optically active compounds having the formula

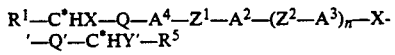

$$R^1—C^*HX—Q—A^4—Z^1—A^2—(Z^2—A^3)_n—X'—Q'—C^*HY'—R^5 \quad \text{II}$$

wherein R¹ is alkyl or perfluoroalkyl with 1-12 carbon atoms or an alkyl or perfluoroalkyl group with 1-12 carbon atoms in which one or two non-adjacent CH₂ or CF₂ groups are replaced by at least one of —O—, —CO—, —COO—, —CH=CH—, —CHhalogen—, —CHCN—, —O—CO—CHhalogen— or —O—CO—CHCN—; R⁵ is different from Y' and signifies alkyl with 1-15 carbon atoms or an alkyl group with 1-15 carbon atoms in which one or two non-adjacent CH₂ groups are replaced by at least one of —O—, —CO—, —O—CO—, —CO—O— or —CH=CH—; A², A³ and A⁴ each independently are unsubstituted 1,4-phenylene or 1,4-phenylene substituted with at least one of F, Cl, CH₃ or CN or having one or two CH groups replaced by N, trans-1,4-cyclohexylene or trans-1,4-cyclohexylene in which one or two non-adjacent CH₂ groups are replaced by at least one of —O— or —S—, piperidin-1,4-diyl, bicyclo 2.2.2]octane-1,4-diyl, naphthalene-2,6-diyl, decalin-2,6-diyl or tetralin-2,6-diyl; Z¹ and Z²each independently are —CO—O—, —O—CO—, —CH₂CH₂—, —OCH₂—, —CH₂O—, —C≡C— or a single covalent bond; X is halogen, cyano or methyl; n is 0 or 1: Q is alkylene with 1-4 carbon atoms, a single covalent bond or alkylene with 1-4 carbon atoms in which one CH₂ group is replaced with —O—, —CO—, —O—CO—, —CO—O—, —CH=CH—COO—, —CH=CH—, —CHhalogen— or —CHCN—; X' is —CO—O—, —O—CO—, —O—CO—O—, —CO—, —O—, —S—, —CH=CH—, —CH=CH—COO— or a single covalent bond; Q' is alkylene with 1-5 carbon atoms, a single covalent bond or alkylene with 1-5 carbon atoms in which a CH₂ group not linked with X' is replaced by —O—, —CO—, —O—CO—, —CO—O— or —CH=CH—; and Y' is cyano, halogen, methyl or methoxy.

In the above formulas I+II, Z¹ and Z² preferably each denote a single covalent bond. Preferably also, all the rings A², A³, A⁴, A, B and C are aromatic, more particularly 1,4-phenylene. Z³ preferably stands for —OOC— and Z⁴ stands for —COO—.

One preferred group of chiral dopants comprises those optically active compounds of formula I in which n stands for the number 1; the rings A, B and C independently denote 1,4-phenylene unsubstituted or substituted by halogen, cyano, methyl and/or methoxy, and in which 1 or 2 groups are replaced by nitrogen if required; Z¹ and Z²each denote a single covalent bond; Z³ denotes —OOC— and Z⁴ denotes —COO—; R¹ and R² independently denote the radical of an optically active terpene alcohol after splitting off the hydroxy group of a chiral group —CH*X¹R³ or —CH₂—C*HX¹—R₃; C* denotes a chiral carbon atom; Z¹ denotes fluorine, chlorine, cyano, methyl or methoxy, and R³ denotes alkyl or alkenyl.

The expression "1,4-phenylene, unsubstituted or substituted with halogen, cyano, methyl and/or methoxy, in which 1 or 1 CH groups are replaced by nitrogen if required", according to the invention, comprises groups such as 1,4-phenylene, fluoro-1,4- phenylene, chloro-1,4-phenylene, cyano-1,4-phenylene, 2,3-dicyano-1,4-phenylene, methyl-1,4-phenylene, methoxy-1,4-phenylene, pyridine-2,5-diyl, pyrimidine-2,5-diyl, pyrazine-2,5-diyl, pyridazine-3,6-diyl and the like.

The term "halogen" comprises fluorine, chlorine, bromine and iodine, preferably fluorine and chlorine.

The expression "radical of an optically active terpene alcohol after splitting off the hydroxy group" denotes the group T of an optically active terpene alcohol having the formula TOH. The term "terpene alcohol" is well known to the skilled addressee, e.g. from Römps Chemie-Lexikon, Volume 6 (1977), and denotes alcohols derived from monoterpenes. The term "monoterpene" includes terpene hydrocarbon C₁₀H₁₅ and hydrogenation and dehydrogenation derivatives thereof. The following are examples of optically active terpene alcohols: (1R,2S,5R)-(−)-menthol, (1S,2R,5R)-(+)-isomenthol, (1S,2S,3S,5R)-(+)-isopinocampheol, (1S)-(−)-borneol, (1R)-(−)-myrtenol, (1S, 2S,5R)-(+)-neomenthol, (−)-carveol, (+)-dihydrocarveol, (+)-terpinene-4-ol, (+)-α-terpineol and the like.

The terms "alkyl" and "alkenyl" include straight-chain and branched radicals, preferably with not more than 15 carbon atoms, such as methyl, ethyl, propyl, isopropyl, butyl, isobutyl, pentyl, hexyl, heptyl, octyl, nonyl, vinyl, 1-propenyl, 1-butenyl, 1-pentenyl, allyl, 2-butenyl, 2-pentenyl, 3-butenyl, 3-pentenyl, 4-pentenyl, 5-hexenyl, 6-heptenyl and the like.

Manufacture of chiral dopants is described in the cited references or can be brought about by similar methods.

The following compounds are examples of particularly preferred chiral dopants (C denotes a crystalline phase, $S_C^*$ denotes a chiral smectic C phase, $S_A$ denotes a smectic A, Ch denotes a cholesteric and I denotes the isotropic phase, the spontaneous polarization $P_S$ was measured for a mixture of 5 wt. % of the dopant and 95 wt. % of 4-oxyloxybenzoic acid-4-hexyloxyphenyl ester, and $P_S^e$ is the extrapolated value of the spontaneous polarization):

4,4''-di-[2(R)-cyano-1-propyloxycarbonyl]-p-terphenyl, m.p. 179, 2° C., $P_S$=5.53 nC/cm², $P_S^e$=111 nC/cm²;

4,4''-di[2(S)-chloro-2-pentyloxycarbonyl]-p-terphenyl, m.p. (C-$S_C^*$) 106° C., $S_C^*$-$S_A$ 110.2° C., $S_A$-CH 140° C., clar. temp. (CH.I) 141 HC, $P_S$=6.8 nC/cm², $P_S^e$=136 nC/cm²;

4,4''-di-[2(R)-chloro-4-methyl-1-pentyloxycarbonyl]-p-terphenyl, m.p. 169.4°-170.0° C., $P_S$=9 nC/cm², $P_S^e$=180 nC/cm²:

4,4''-di-[2(S)-cyano-4-methyl-1-pentyloxycarbonyl]-p-terphenyl, m.p. 129°-131° C. $P_S$=20 nC/cm², $P_S^e$=400 nC/cm²;

4,4''-di-[1(R),2(S),5(R)-methyloxycarbonyl]-p-terphenyl, m.p. 168°-169° C., $P_S$=11 nC/cm², $P_S^e$=220 C/cm²;

4,4''-di-[2(R)-cyano-2-pentyloxycarbonyl]-p-terphenyl, $P_S$=20 nC/cm², $P_S^e$=400 nC/cm²;

4,4''-di-[2(S)-chloro-1-butyloxycarbonyl]-p-terphenyl, m.p. (C-$S_A$) 137.3° C., $S_A$-CH 139.3° C. clar. temp. (Ch-I) 153° C., $P_S$=3.4 nC/cm², $P_S^e$=68 nC/cm²;

4,4''-di-[2(R)-cyano-1-butyloxycarbonyl]-p-terphenyl, m.p. 129.9° C., $P_S$=12.5 nC/cm$^2$, $P_S^e$=250 nC/cm$^2$;
4,4''-di-[2(R)-cyano-1-hexyloxycarbonyl]-p-terphenyl, $P_S$=23 nC/cm$^2$, $P_S^e$=460 nC/cm$^2$;
4,4''-di-[2(S)-chloro-3-methyl-2-butyloxycarbonyl]-p-terphenyl, m.p. 171.1° C., $P_S$=8.0 nC/cm$^2$, $P_S^e$=160 nC/cm$^2$;
4,4''-di-[2(R)-cyano-3-methyl-1-butyloxycarbonyl]-p-terphenyl, m.p. 132.9° C., $P_S$=11.2 nC/cm$^2$, $P_S^e$=224 nC/cm$^2$;
4,4''-di-[1(S)-(methoxycarbonyl)ethoxy]-p-terphenyl, m.p. 142.6° C., $P_S$=15.4 nC/cm$^2$; $P_S^e$=308 nC/cm$^2$;
4,4'-di-[1(S)-(ethoxycarbonyl)ethoxy]-p-terphenyl, m.p. 91.3° C., $P_S$=13.75 nC/cm$^2$; $P_S^e$=275 nC/cm$^2$;
4,4''-di-[1(S))-methyl-2-2(ethoxycarbonyl)ethoxy]-p-terphenyl, $P_S$=3.75 nC/cm$^2$; $P_S^e$=75 nC/cm$^2$.

The phenyl pyrimidines having the formula VII given in U.S. application Ser. Nos. 07/464,610 and 07/455,470 (EP-A-0 269 963) described above are particularly suitable compounds for the aforementioned $S_C$ materials.

Preferably the $S_C$ hose mixture contains at least about 50 wt. % of the aforementioned compounds.

A particularly preferred mixture consists of
10 wt. % 4-decyloxy-2,3-difluorobenzoic acid-4-[(2-trans-4-heptylcyclohexyl)ethyl]phenyl ester,
21 wt. % 5-octyl-2-(4-octyloxyphenyl)pyrimidine,
21 wt. % 5-octyl-2-(4-nonyloxyphenyl)pyramidine,
21 wt. % 5-octyl-2-(4-decyloxyphenyl)pyrimidine,
27 wt. % 4,4''-di-[2()-octyloxycarbonyl]-p-terphenyl.

The exact configuration of the liquid crystal, however, is not known. It is assumed that twist and the like also occur inside the layers but are not at present measurable. Also, the liquid crystal is in a dynamic equilibrium, i.e. the structures are subject to continuous changes. For this reason, no molecular arrangement is shown in the drawings.

Figure 2:
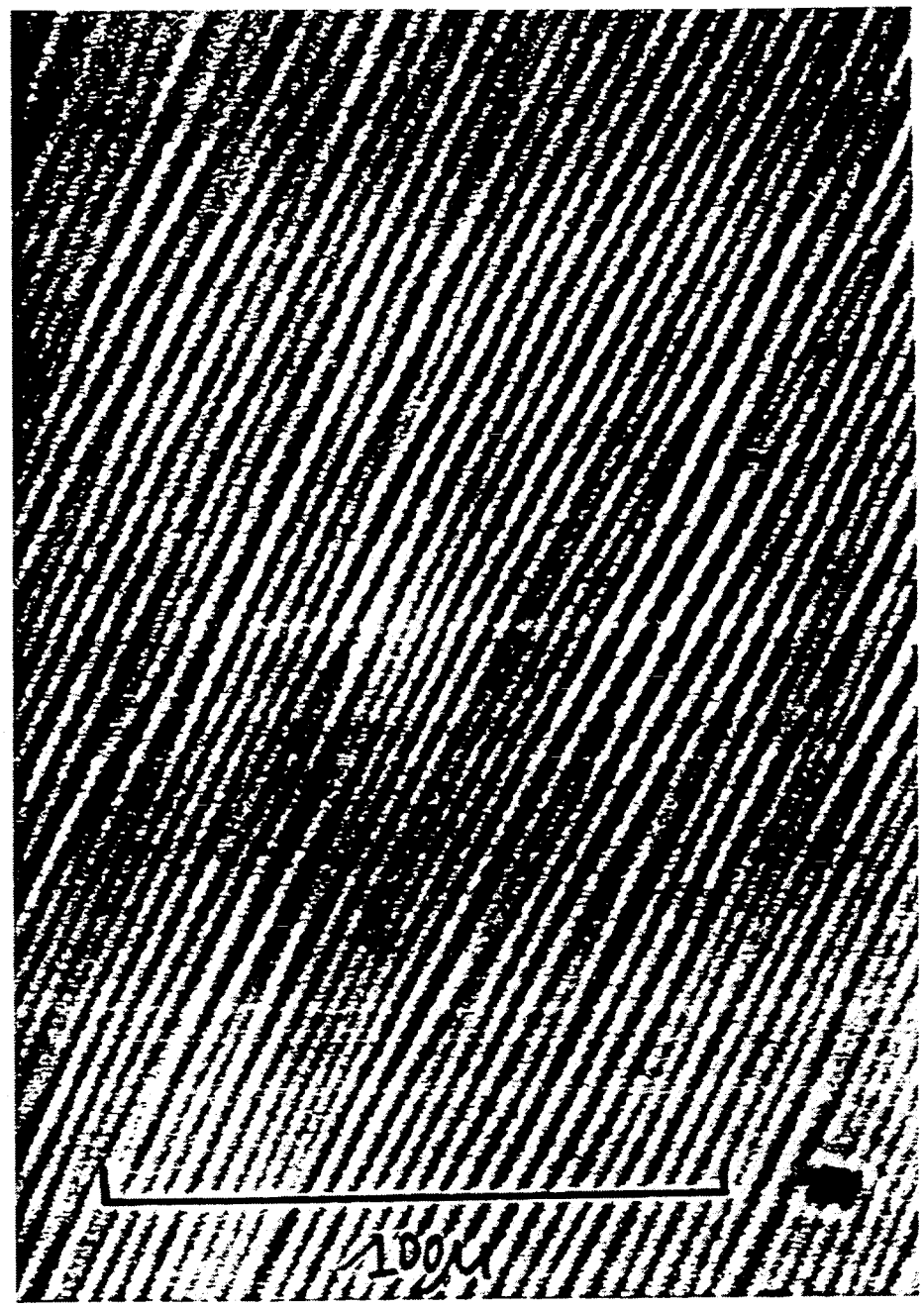
FIG. 2 shows the texture of the cell in a preferred embodiment of the invention.

On the other hand, the texture of the liquid crystal in the cell is characteristic and distinguishable from other textures known in the prior art. As shown in FIG. 2, the texture recorded in a cell according to the invention with a 2μ thick layer without an applied voltage and between crossed polarizers, is characterized by substantially parallel dislocation lines. Only one plate has a surface orientation produced by rubbing.

Figure 3:
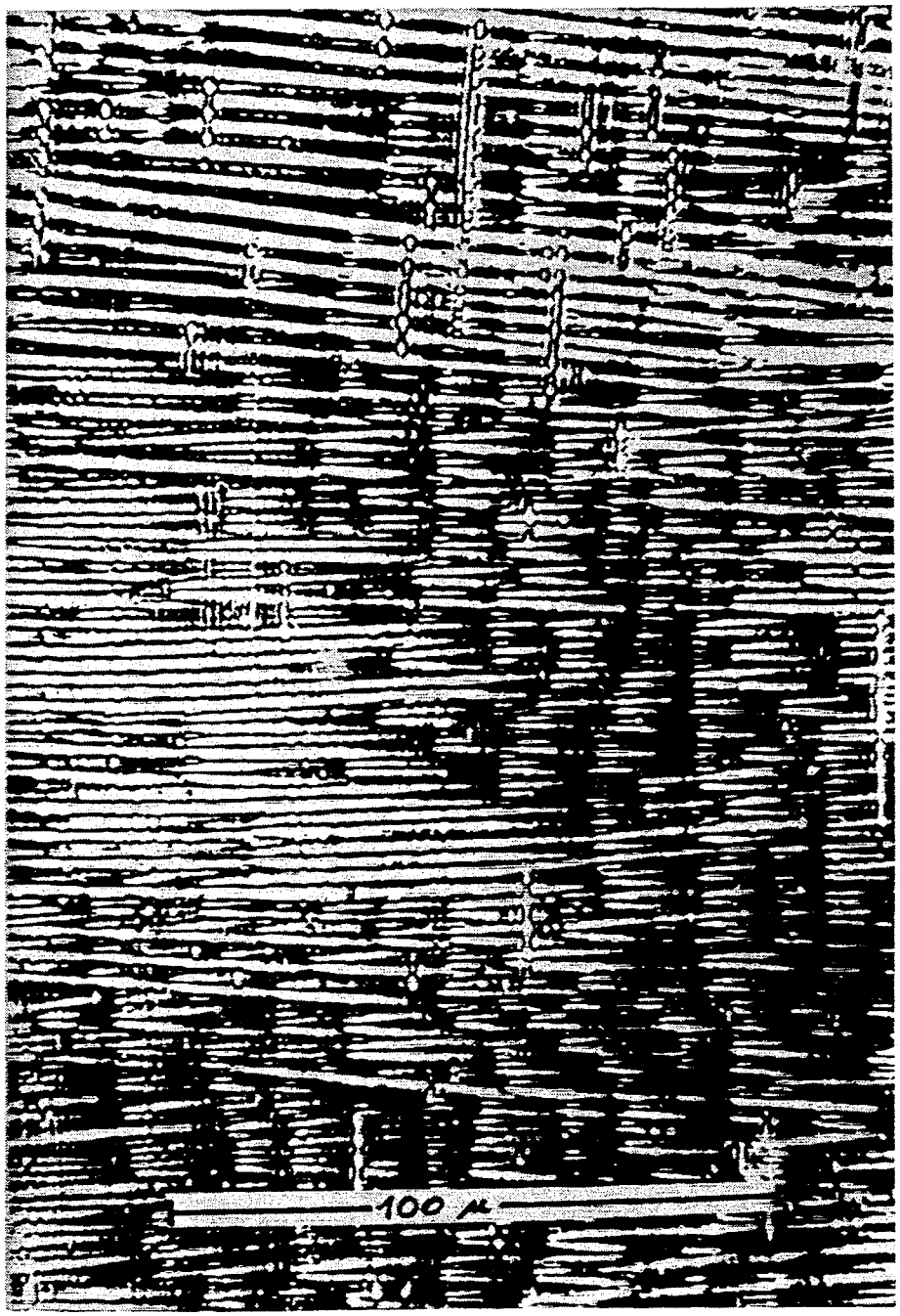
FIG. 3 shows the texture of a prior-art DHF cell.

The texture shown for comparison in FIG. 3 was recorded in a DHF cell of similar structure, except that the two plates were rubbed parallel to one another. As can be seen, this structure has a lack of directional arrangement and thus differs greatly from the texture in FIG. 2.

The liquid crystal mixture is filled between the plates when hot, i.e. by capillary action when in the isotropic state, and is cooled to room temperature at an applied a.c. voltage of 30 V, 10 kHz.

If a voltage is applied to electrodes 6 and 7, an electric field is produced in the liquid crystal and re-orients the molecules. In practice, the symbolically-indicated voltage source 10 delivers periodic signals or actuating pulses which can have opposite polarity in the present cell, as explained in detail hereinafter.

When the cell has been shaped by an electric field, i.e. the helix has been wound, the director, when no field is applied, is in one of two bistable positions. If a suitably polarized voltage is applied, it can be flipped into the other stable position, thus altering the light-transmitting capacity of the cell. The optical contrast is greatest if firstly the angle is chosen so that the light-transmitting capacity is at a minimum in one stable position, and if secondly the switching angle (the angle between the projections of the director on to the plane of the electrodes in the two stable positions) is substantially equal to 45°.

Figure 4:
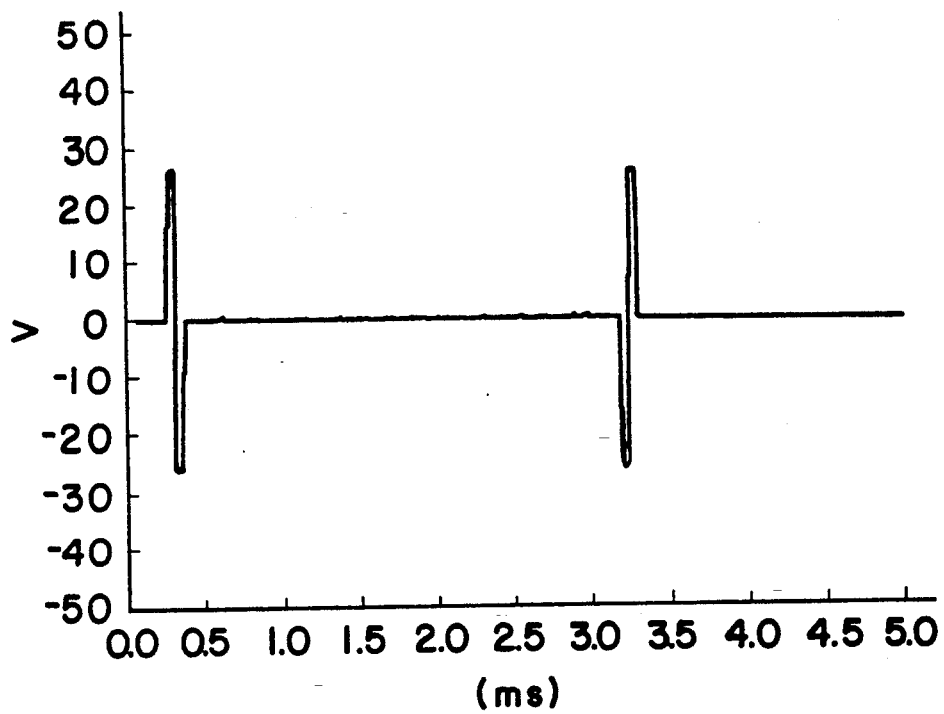
FIG. 4 shows part of a pulse sequence for actuating the cell in FIG. 1.

Test measurements were made on a cell having the aforementioned construction. A pulse sequence, part of which is shown in FIG. 4, was applied to the cell. The sequence increases in linear manner from zero to 26 V. The last pair of pulses is shown. The left bipolar pulse switches the cell from light to dark whereas the right-hand pulse switches from dark to light. The width of each positive and negative pulse is 40 μsec. An important feature of this actuation is that the average value of the applied voltage is zero, preventing electrochemical decomposition of the liquid crystal.

Figure 5:
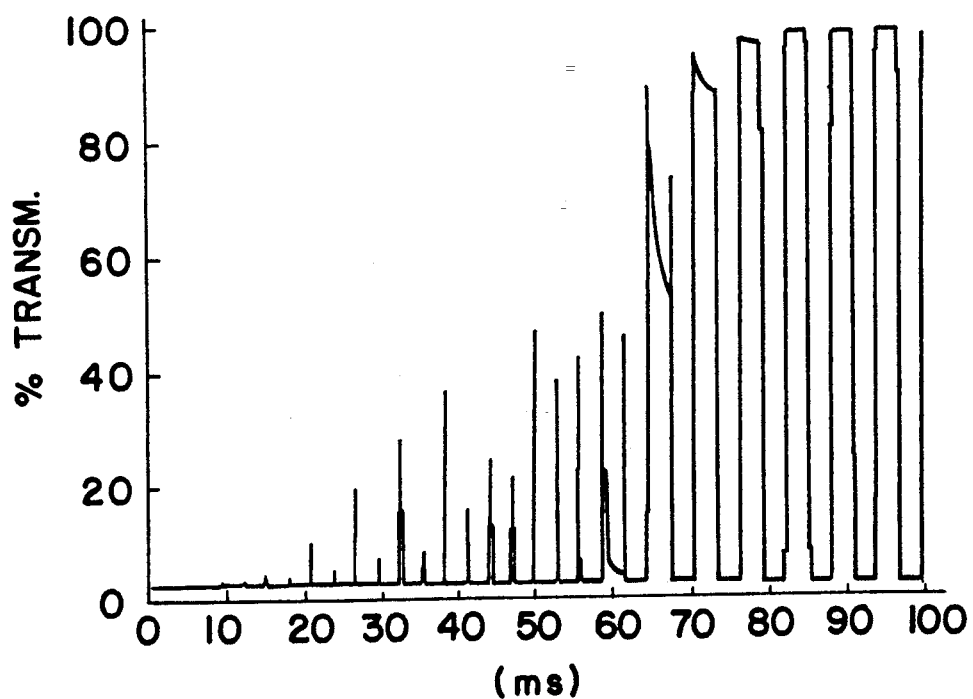
FIG. 5 shows the transmittance of a 1.8$\mu$ thick cell, in the case of the pulse sequence shown in FIG. 4.

As long as the pulse amplitude is below the switching time for this pulse length, there is practically no change in light-transmitting capacity, whereas complete switching occurs above this amplitude. This property is important for multiplexing. FIG. 5 shows the corresponding transmission curve for the top liquid-crystal mixture in a 1.8μ thick cell and with the pulse sequence shown in FIG. 4 at 25° C.

We claim:
1. A liquid crystal display cell comprising:
   (a) two plate means, the first plate means having one surface connected to a first polarizer and a second surface having directional means for aligning liquid crystal molecules in the liquid crystal display cell, and its second plate means having one surface facing the directional means and a second surface connected to a second polarizer;
   (b) chiral ferroelectric smectic liquid crystal means sandwiched between the two plates means having a structure which is influenced by an electric field so that its optical anisotropy changes and having an achiral smectic C host mixture with a spontaneous polarizability of about P > 10 nC/cm$^2$ and a smectic C tilting angle of about $\theta$ > 10°, the host mixture comprising at least two liquid crystal components, the first component having a tilted smectic phase and the second component having at least one chiral dopant which induces a helical pitch in the host mixture of about p < 1 μm; and
   (c) electrode means for applying an electrical field to said plate means, the electrical field shaping the chiral ferroelectric smectic liquid crystal means so that after shaping at about a 0 voltage and with the first polarizer in a cross position with the second polarizer, the liquid crystal display cell forms dark parallel stripes.

2. A cell according to claim 1, wherein the tilted smectic phase of the first component is a smectic C phase.

3. A cell according to claim 1, wherein the first polarizer has an angle $\beta$ and the second polarizer has an angle $\beta$ to form cross polarizers.

4. A cell according to claim 1, wherein the the chiral ferroelectric smectic liquid crystal means comprise 5–30 wt. % phenyl benzoate having a cyclohexyl radical bonded via a flexible group; 30–85 wt. % additional smectic C materials; and 10–40 wt. % chiral dopant having two terminal chiral groups.

* * * * *